United States Patent [19]
Arnold

[11] 3,912,016
[45] Oct. 14, 1975

[54] HYDRAULICALLY POWERED ROOT AND SOIL SEPARATING AND WINDROWING APPARATUS

[76] Inventor: Winfred A. Arnold, P.O. Drawer B, Three Rivers, Tex. 78017

[22] Filed: Apr. 24, 1974

[21] Appl. No.: 463,748

Related U.S. Application Data

[63] Continuation-in-part of Ser. No. 242,725, April 10, 1972, Pat. No. 3,821,988.

[52] U.S. Cl. ............................................. 171/133
[51] Int. Cl.² ........................................ A01D 19/02
[58] Field of Search ......... 171/133, 61, 109; 56/344

[56] References Cited
UNITED STATES PATENTS
3,627,051  12/1971  Schmitz .......................... 171/133 X
3,748,840   7/1973  Kanengieter ..................... 56/344 X

*Primary Examiner*—J. N. Eskovitz
*Attorney, Agent, or Firm*—John C. Stahl; Wayland D. Keith

[57] ABSTRACT

A root and soil separating and windrowing apparatus to be attached to a conventional root plow, which plow is pulled behind a tractor, so as the plow cuts the roots of trees and brush the roots and soil will be directed onto a series of hydraulically power driven rotary beater blade elements which are mounted on transverse shafts, the circular paths of the beater blade elements on one shaft pass between paths of the beater blade elements on adjacent shafts, so as to separate the roots from the soil and move the roots rearwardly into the catcher element, which roots may be dumped from the catcher element periodically, as in windrows, to enable the roots to be burned or hauled away. Provision is made to detachably connect longitudinal frame members in spaced apart relation by at least one transverse brace and by angular braces to maintain the frame, when in use, in rigid relation but enables the apparatus to be quickly disassembled for transport and to be quickly reassembled for use. A power unit, independent of the tractor, is provided to drive a hydraulic pump to selectively drive a hydraulic motor in either direction to drive the beater blade shafts.

10 Claims, 24 Drawing Figures

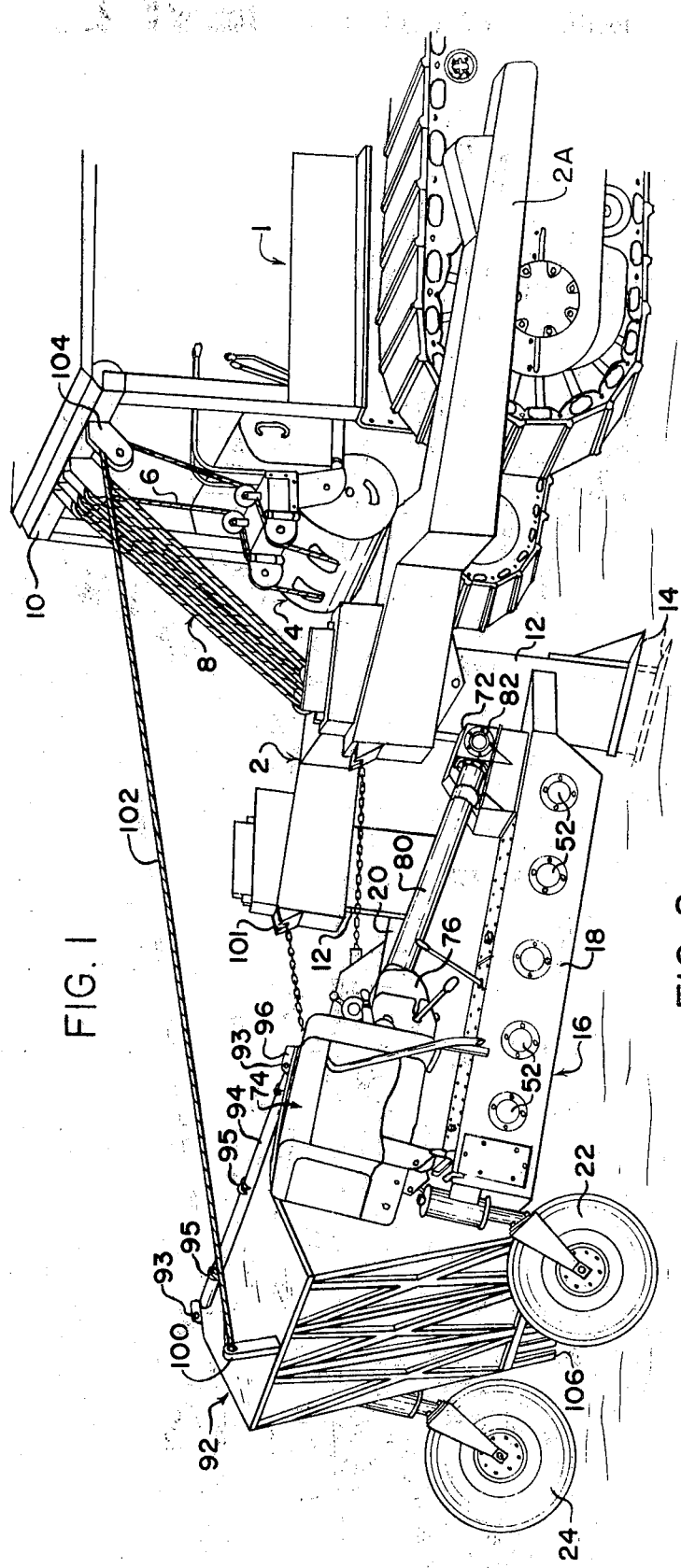
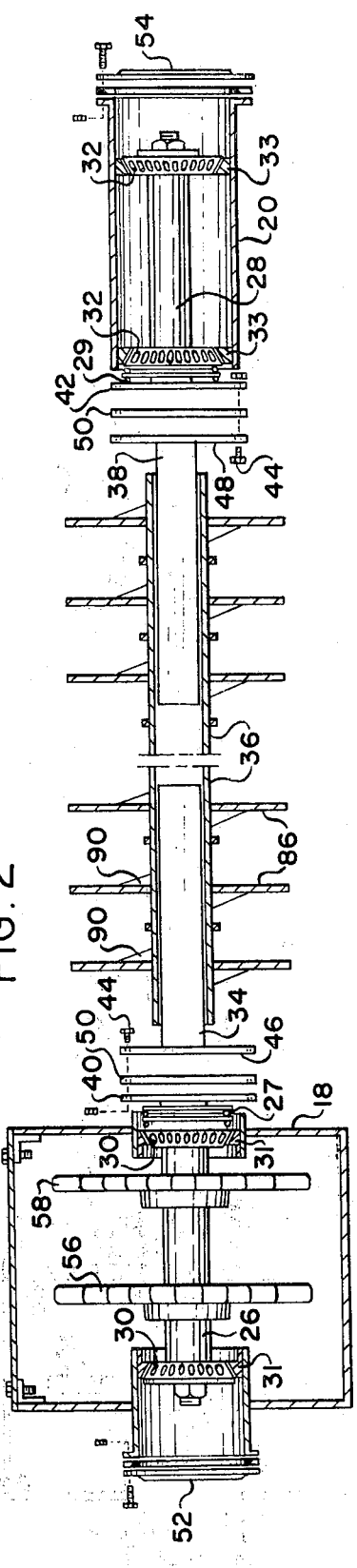
FIG. 1
FIG. 2

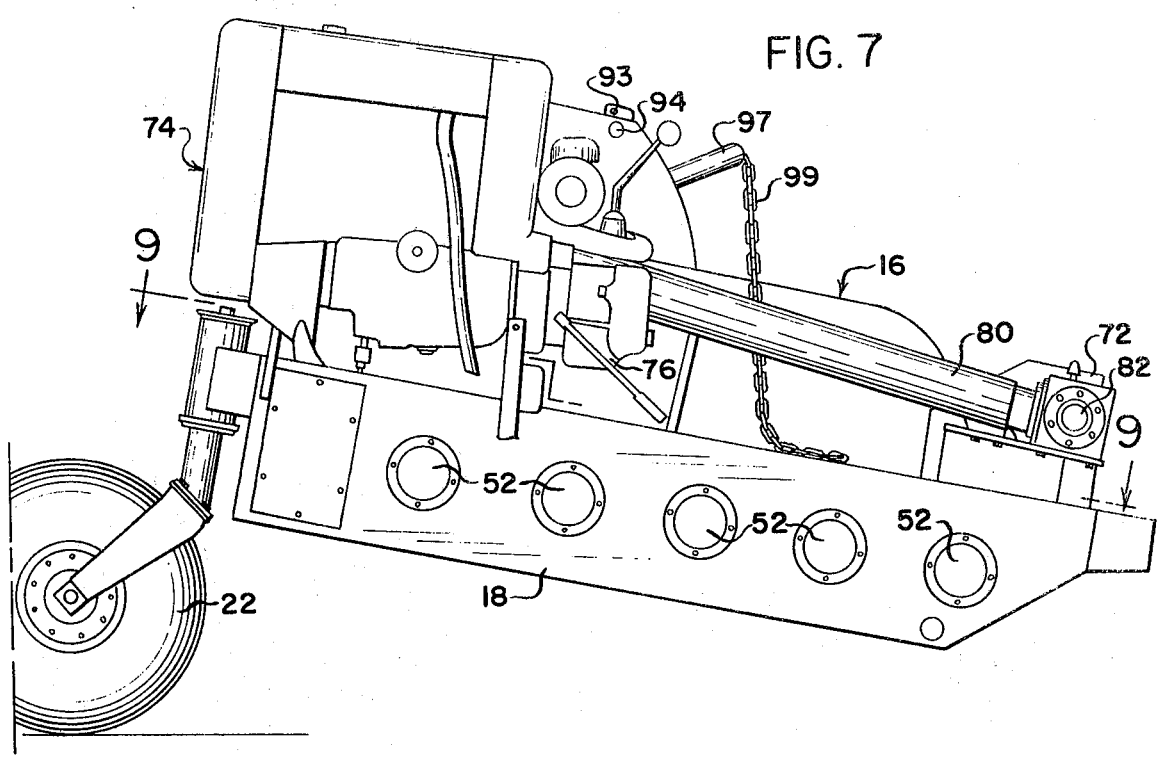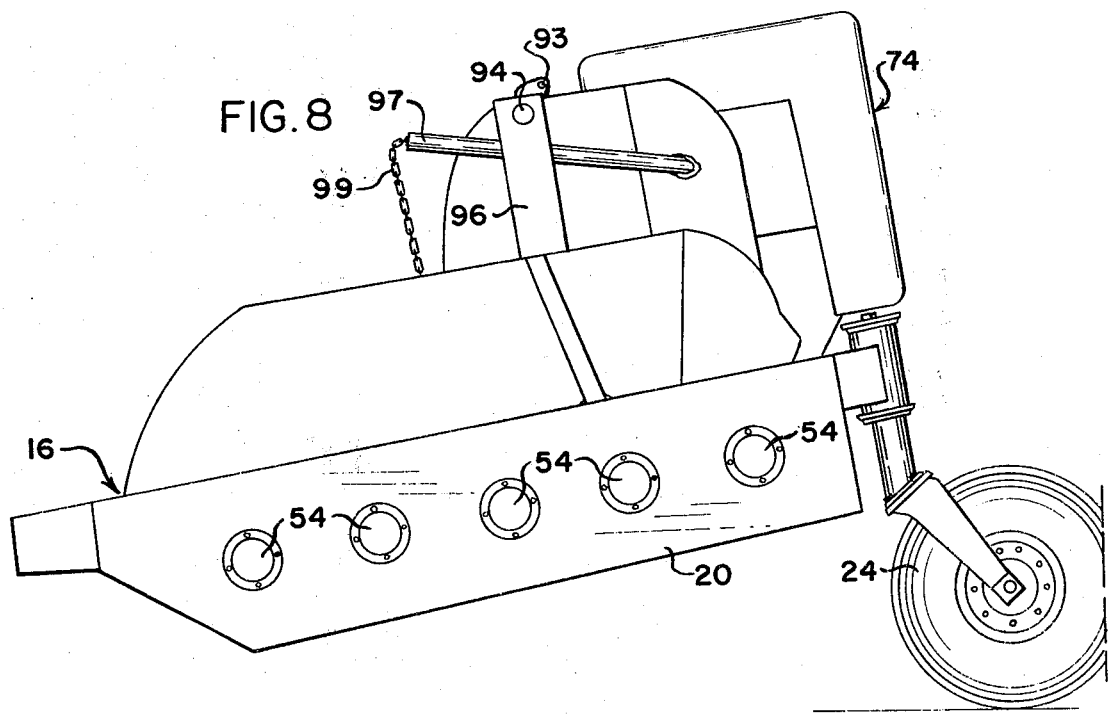

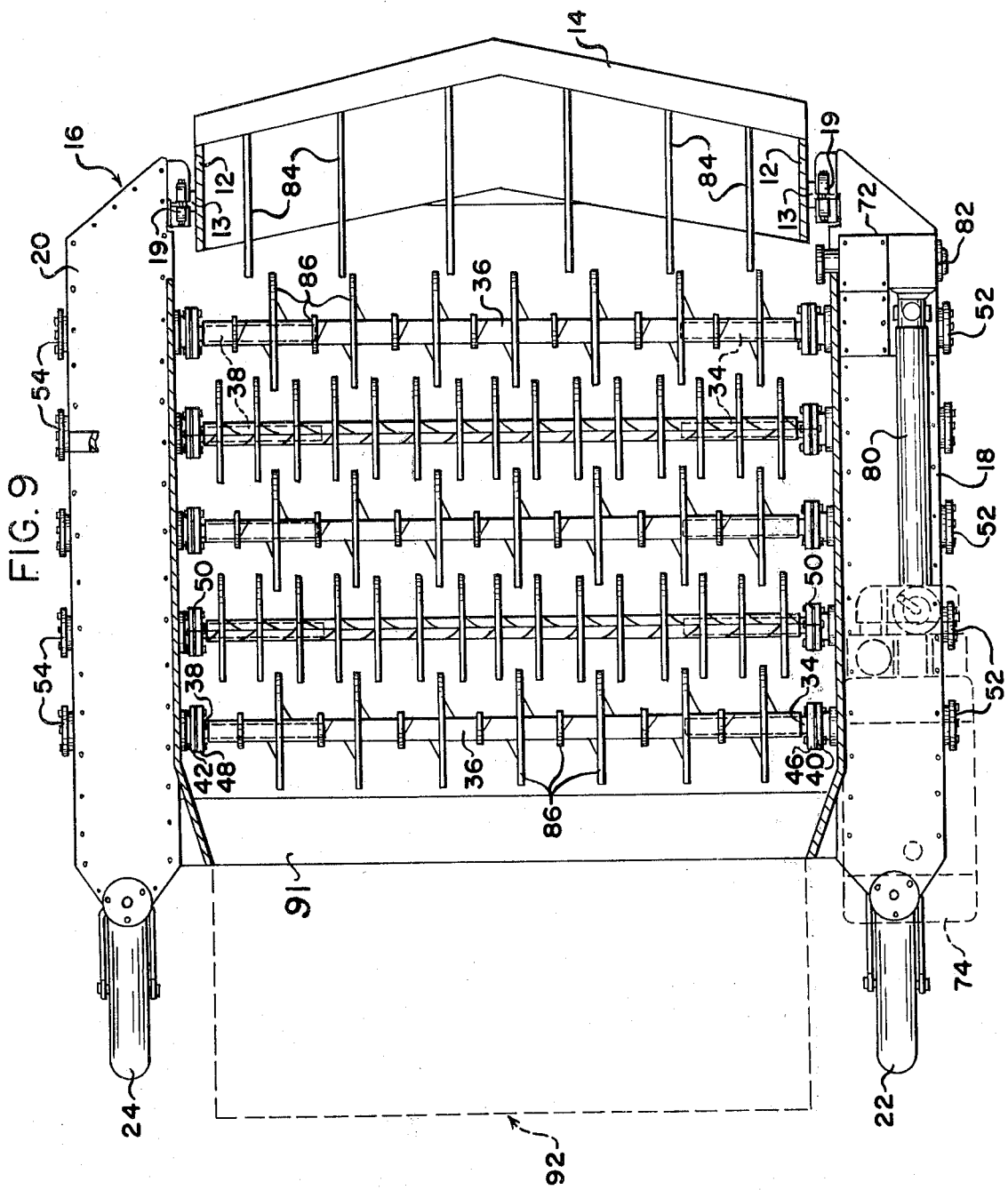

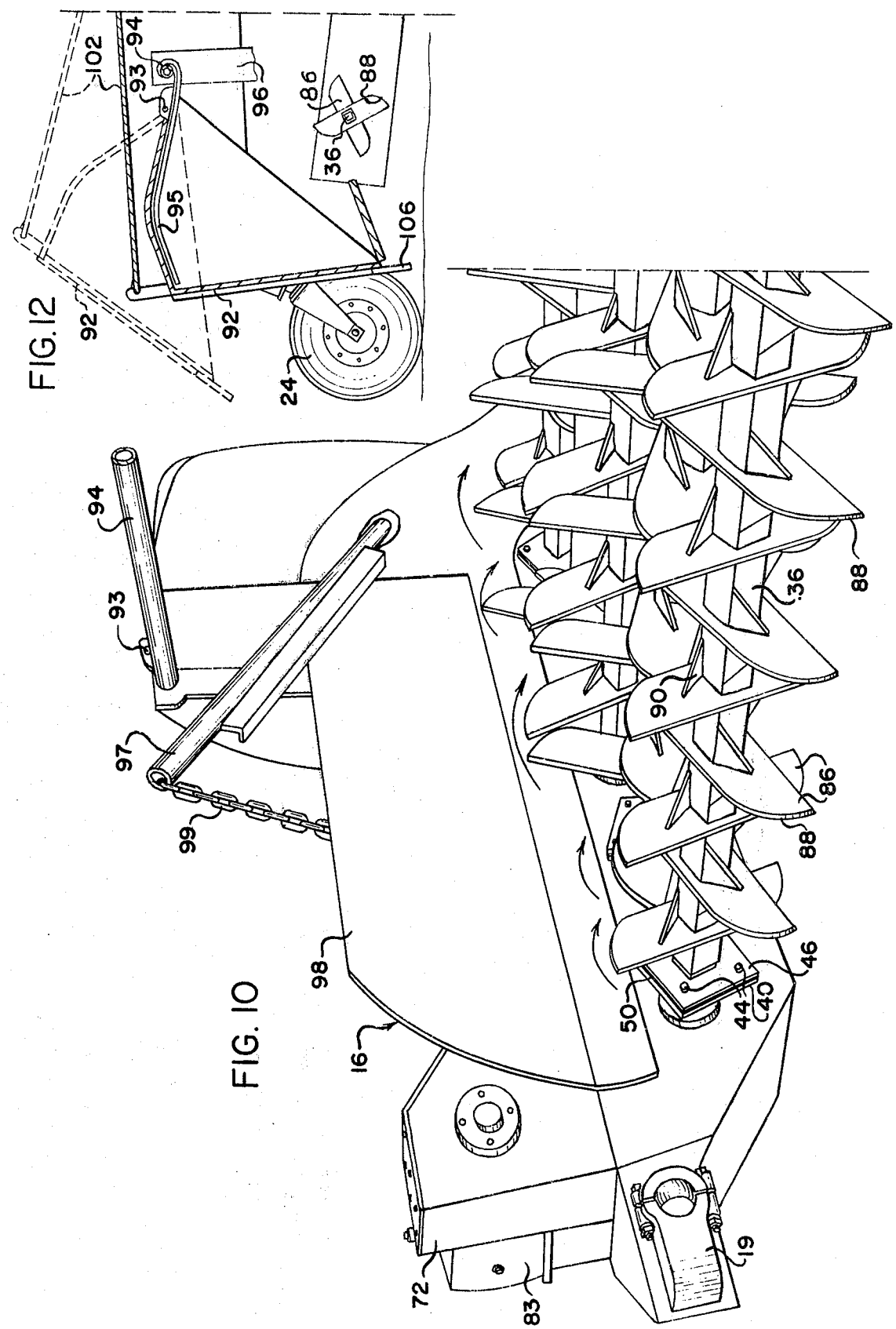

3,912,016

HYDRAULICALLY POWERED ROOT AND SOIL SEPARATING AND WINDROWING APPARATUS

This application is a continuation-in-part of my copending application Ser. No. 242,725, filed Apr. 10, 1972 and now U.S. Pat. No. 3,821,988.

This invention relates to a root and soil separating and windrowing apparatus to be attached to a root plow, which plow is pulled behind a prime mover, such as a tractor.

Root plows which are pulled behind tractors for plowing up the roots of trees and brush are old in the art, however, these, for the most part, leave the roots exposed or partially exposed, and the removal of such roots from the land being cleared presents a difficult problem, as the soil and rocks need to be removed from the roots before the roots are moved to a place of disposal. The removal of the soil and the like from the roots has heretofore been a difficult and time consuming process.

The present device is so constructed that it may be attached to a root plow, immediately rearward thereof, so that the roots, as they are plowed up, are elevated and directed onto the present root separting and windrowing apparatus. The root separating apparatus separates the soil, rocks and the like from the roots, which roots are conveyed rearwardly to be deposited in a root catcher, which may be unloaded or dumped periodically. The roots may be dumped in rows to form windrows, thereby enabling the roots to be readily burned, hauled away or otherwise disposed of.

The root separating device utilizes a series of beater elements thereon, the shafts of which are arranged in parallel relation, which shafts and beater elements are driven in the same direction, by the power unit, to dislodge the soil and the like from the roots, and to convey the roots into a root catcher, which is pivotally attached to the rear of the apparatus.

OBJECTS OF THE INVENTION

An object of this invention is to provide a root separator to separate the roots from soil and rocks as the roots are plowed from the ground.

Another object of the invention is to provide a separator for separating soil rocks and the like from roots, which separator is attached to a root plow and separates the roots from the soil and the like, as the roots are plowed up.

Still another object of the invention is to provide a root separator for separating roots from soil, rocks, and the like, which will direct the roots into a catcher where they are retained for a period of travel, then dumped into windrows, as desired.

Yet another object of the invention is to provide a root and soil separator which has removable shafts, which shafts may be removed and replaced without disassembly of the apparatus.

A further object of the invention is to provide an apparatus for separating roots of trees and bushes and the like from soil, with the shafts of the apparatus being arranged transversely thereof, with the shafts being provided with a universal joint at each end thereof to enable the shafts to be run out of alignment without harm to the apparatus.

Still another object of the invention is to provide a root and soil separating apparatus with side members, detachable transverse members, and detachable angulated brace members which enables the apparatus to be quickly disassembled and reassembled in a minimum of time.

Yet another object of the invention is to provide a prime mover on a root and soil separating apparatus to drive a variable capacity hydraulic pump to drive a reversible hydraulic motor which is connected in driving relation with beater blade shafts to remove the soil from the roots and the like.

Still a further object of the invention is to provide a root and soil separator which is relatively compact, simple in operation, relatively low in the cost of construction, considering the magnitude of the results to be accomplished.

Another object of the invention is to provide an electrically controlled, hydraulically actuated closure for the root receiving receptacle to enable the closure to be controlled from the operator's position on the traction element.

Another object of the invention is to provide an electrical system to control a solenoid valve mechanism which is interlocked to control the introduction of fluid into and out of the cylinders of the hydraulic system.

BRIEF DESCRIPTION OF THE DRAWINGS

With these objects in mind and others which will become manifest as the description proceeds, reference is to be had to the accompanying drawings, in which like reference characters designate like parts in the several views thereof, in which:

FIG. 1 is a perspective view showing the top, a side, and an end of a crawler type tractor, which tractor has a root plow attached thereto, with the root and soil separator attached to the root plow, showing a root catcher pivotally mounted on the rear of the root and soil separator, and showing, in dashed outline, the root plow adjusted to cut deeper into the ground;

FIG. 2 is an exploded view taken transversely through the housing, approximately on the section 2—2 of FIG. 8, showing the bearing, sprocket and shaft arrangement, with the squared hollow shaft being broken away and shortened and being shown positioned about a squared shaft on which it is mounted;

FIG. 7 is a side elevational view of the root and soil separator disconnected from the root plow, the root catcher not being shown, but showing the power unit and drive mechanism as connected in driving relation with the root and soil separator;

FIG. 8 is a view similar to FIG. 7 but of the opposite side of the apparatus;

FIG. 9 is a sectional view taken on the line 9—9 of FIG. 7, looking in the direction indicated by the arrows, but showing a root cutter blade attached thereto, with the root catcher being shown in dashed outline;

FIG. 10 is a fragmentary perspective view of the front portion of the root and soil separator, showing the ball joint connection member to which the root plow is connected and also showing the tower shaft and bevel gear housing of the drive mechanism.

FIG. 12 is a fragmentary longitudinal sectional view of the rear portion of the root and soil separator, showing a root catcher attached thereto, the root catcher being shown in raised position in dashed outline;

DETAILED DESCRIPTION

Figure 3:
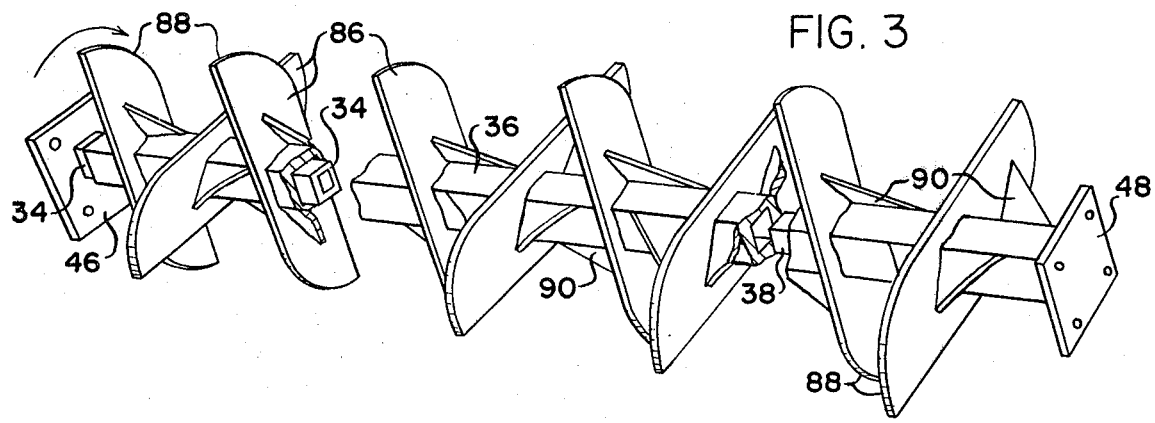
FIG. 3 is a perspective view of one of the root and soil separator shaft assemblies removed from the apparatus, with parts being broken away and shortened to show the details of construction and the bracing of the beater elements.

With more detailed reference to the drawing, the numeral 1 designated generally a tractor, which is shown to be of the crawler type, which tractor has a root plow, designated generally by the numeral 2, pivotally attached thereto for raising and lowering the root plow by means of a winch 4 which is mounted on the tractor. A winding cable 6 is attached to the winch and which forms a block and tackle arrangement 8 between the overhead support member 10, on the tractor, and the root plow mechanism designated generally at 2. The root plow 2 has a shank 12 on each side thereof to which the blade 14 of the root plow is rigidly connected. The angularity and depth setting of root plows is well known in the art of root plows. The blade 14 as shown in dashed outline position, for a deeper setting of the root plow. Since the root plow and the tractor are accessory to the present invention, the detailed operation thereof has been omitted for the sake of brevity.

The root and soil separator apparatus is designated generally by the numeral 16 and has longitudinal side members 18 and 20. Each shank 12, of the plow, has an outwardly extending ball member 13 secured thereto to engage with split, bolted socket connector member 19, one portion of which socket member is secured to the forward end of the respective side members 18 and 20 to enable the root separator 16 to be pivotally connected to the plow. The side member 18 has a caster wheel 22 pivoted on an upright axis at the rear end thereof, and the side member 20 has a caster wheel 24 pivotally mounted on the rear end thereof, which caster wheels are shown in FIGS. 1, 7, 8, 9, and 11 of the drawings. As will best be seen in FIG. 2, the side members 18 and 20 form housings in which to journal the respective shafts 26 and 28, each shaft has a bearing seal 27 and 29 respectively therearound to retain lubricant therein. The anti-friction bearings, designated at 30 and 32 respectively, have bearing races 31 and 33 respectively to journal the bearings in the respective housings. The shafts 26 and 28 are independently journaled in the respective housings, and the shafts 34, 36 and 38, which extend therebetween, may be removed and replaced without disturbing the adjustment of the anti-friction bearings within the races in the respective housings 18 and 20.

The shafts 34 and 38 are preferably polygonal in shape to be received by a complementary, hollow polygonal shaft 36, such as a square shaft, so that the shaft 36 will have limited longitudinal sliding movement on shafts 34 and 38, when fitted in place, but will be sufficiently loose on shafts 34 and 36 to be maintained against lateral binding action, should misalignment occur.

Figure 6:
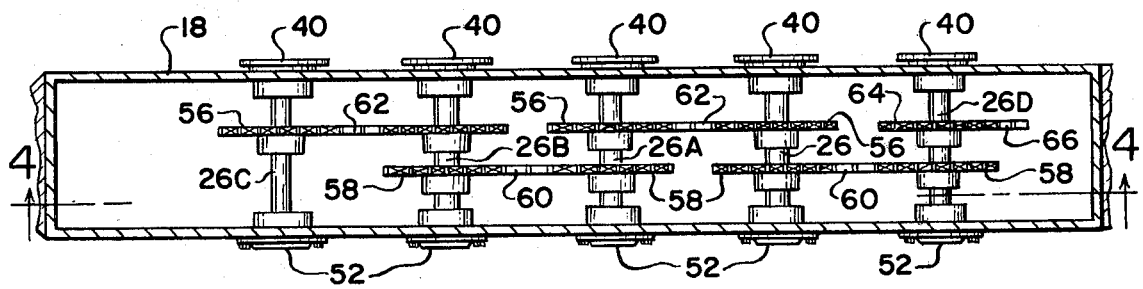
FIG. 6 is a sectional view taken on the line 6—6 of FIG. 4, looking in the direction indicated by the arrows, and showing the plan view of the drive arrangement of the sprockets which drive the beater shafts.

The shafts 26 and 28 have the respective flanges 40 and 42 thereon, as will best be seen in FIG. 2 and FIGS. 6 and 8, which flanges have bolt holes formed therein to receive bolts 44 therethrough and through the respective flanges 46 and 48 on the stub shafts 34 and 38 respectively, to join the shafts 26, 34, 36, 38 and 28 in end to end relation, as the flanges 46 and 48 are complementary to the respective flanges 40 and 42.

It is preferable to have a yieldable element 50 intermediate the respective pairs of flanges so as to enable a degree of alignment of the shafts 34 and 38 with respect to the shaft 36. The housing 18 has bearing housings 52 therein to receive bearing races 31 to maintain the bearings 30 in aligned relation and to properly journal the shafts therein, as will best be seen in FIGS. 2 and 9. Likewise, the housing 20 has a bearing housing 54 therein to receive bearing race 33 to maintain the bearings 32 is aligned relation, so as to properly journal idler shafts 28 therein.

Figure 4:
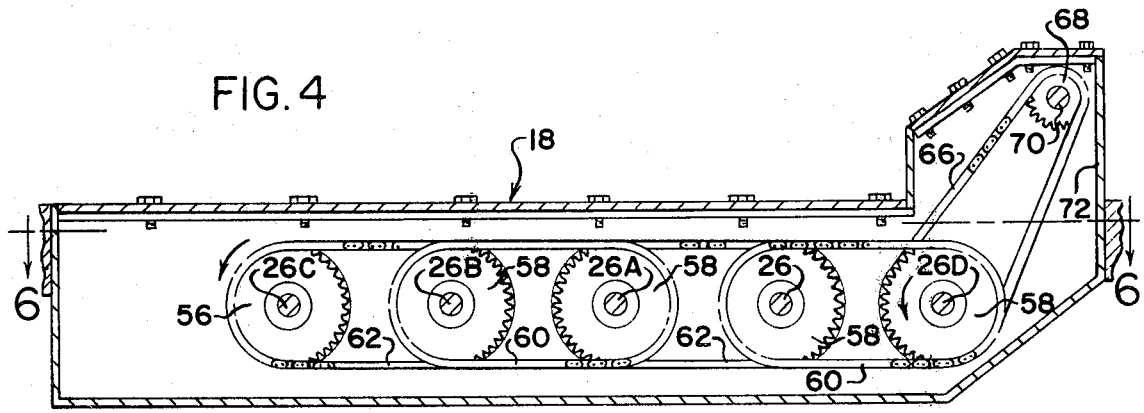
FIG. 4 is a longitudinal sectional view taken on the line 4—4 of FIG. 6, looking in the direction indicated by the arrows, and showing the drive arrangement of the root separator shafts.

The shaft 26 has sprockets 56 and 58 fixedly secured thereto for rotation therewith, which sprockets 56 and 58 drive chains 60 and 62 which chains drive similar sprockets on shafts 26A, 26B, 26C, to rotate the sprockets in the direction indicated by the arrows in FIG. 4. The sprockets 58 have chain 60 surrounding these sprockets and the sprockets 56 have chain 62 surrounding these sprockets.

Figure 5:
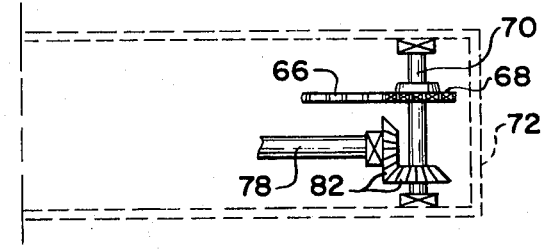
FIG. 5 is a diagrammatic view of the bevel gear drive arrangement for driving the root and soil separator shafts.

The forward-most shaft 26D has a sprocket 64 thereon, which sprocket is driven in chain 66 which surrounds sprocket 64 and sprocket 68, as will best be seen in FIGS. 4, 5 and 6. The sprocket 68 is mounted on a shaft 70, which shaft is journaled in tower shaft housing 72, as will best be seen in FIGS. 4 and 5, taken with exterior views, as shown in FIGS. 1 and 7, which show the housing.

An independent prime mover, designated generally by the numeral 74, is mounted on housing 18, and drives through clutch and transmission arrangement 76 and through a drive shaft 78 within drive shaft housing 80 to drive a right angle gear arrangement, such as bevel gears 82, to drive shaft 70, as will best be seen in FIGS. 4 and 5. The transmission-clutch arrangement 76 allows the driving of shafts 70, 26D, 26, 26A, 26B, and 26C at a selected speed to properly convey the roots, directed from the root plow blade 14 upwardly onto spaced apart bars 84 onto beater blades 86 on shaft 36, as particularly shown in FIGS. 3, 6, 9, 10, and 11.

Figure 11:
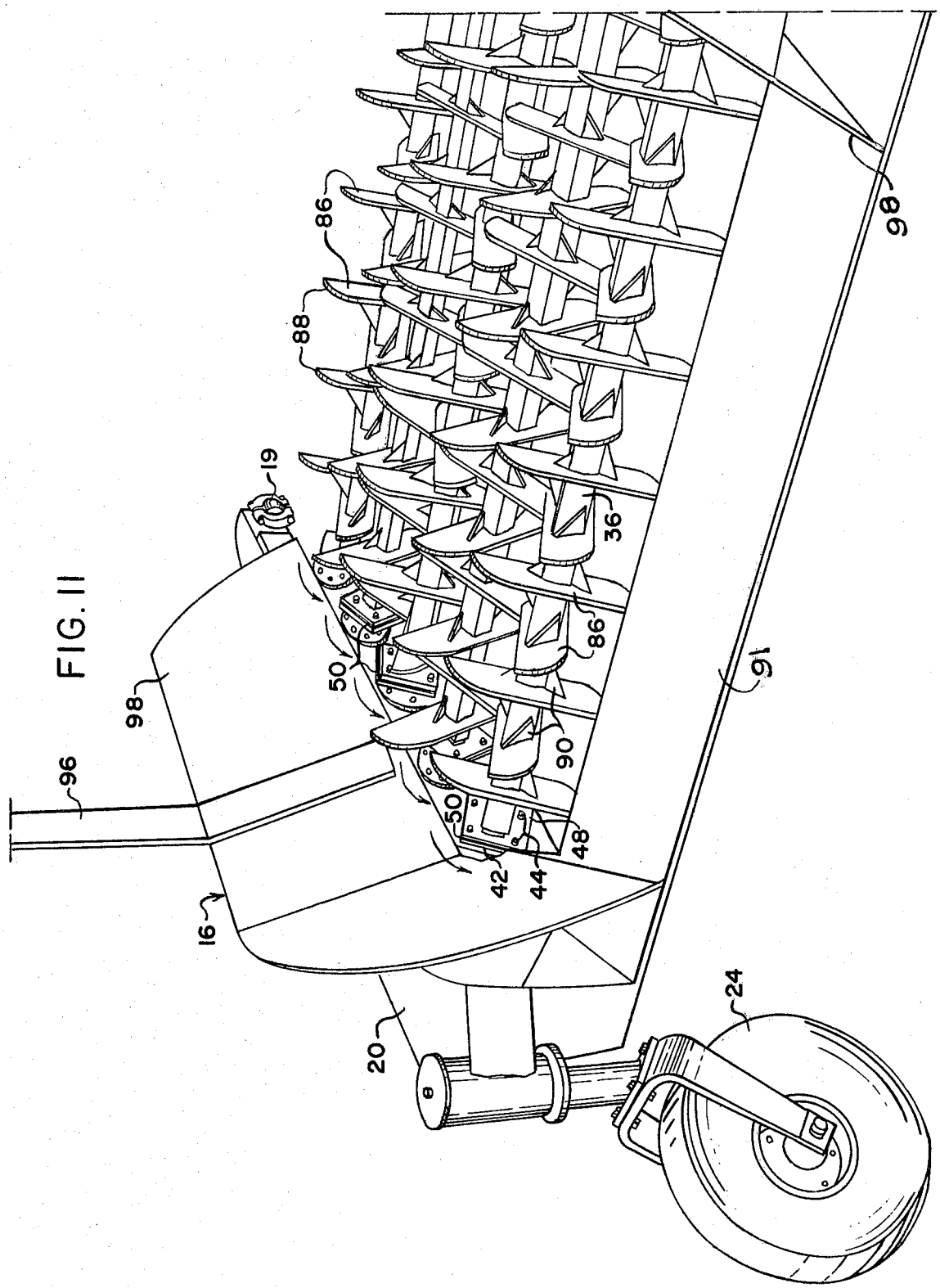
FIG. 11 is a fragmentary view of the opposite end of the root catcher being attached thereto.
Figure 13:
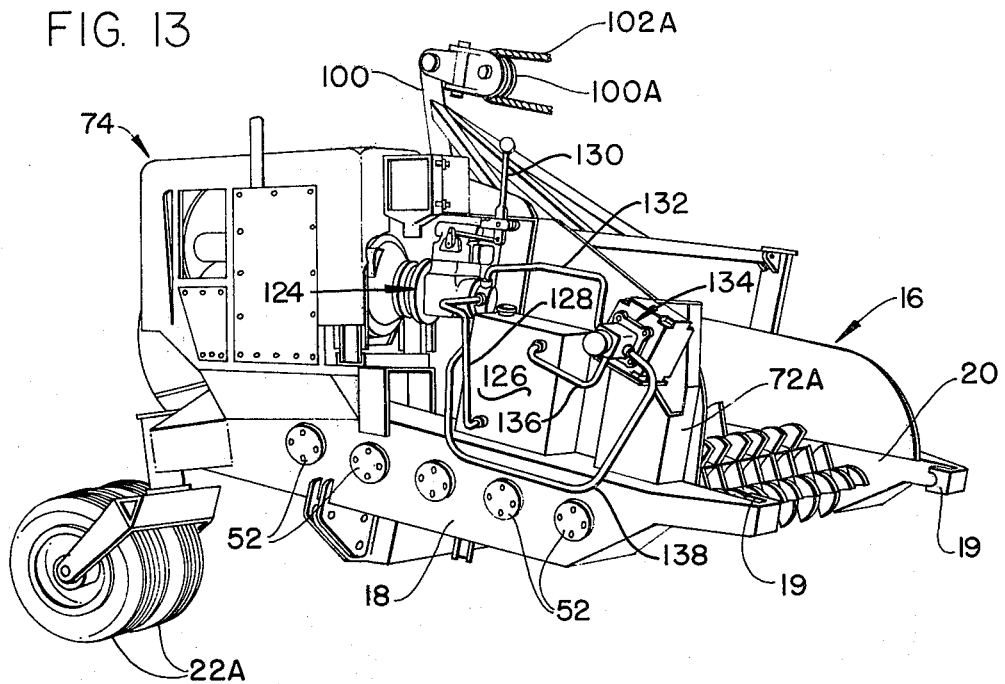
FIG. 13 is a perspective view of an apparatus for separating soil from the roots of trees, bushes and the like, showing a prime mover mounted on the frame thereof, which prime mover is mounted in driving relation with a variable capacity hydraulic pump and a hydraulic circuit including a reversible hydraulic motor and a reservoir.

The beater blades rotate in the direction indicated by the arrows in FIGS. 3, 10, and 11, with the rounded portion 88 of the beater blades 86 moving the roots rearward from the forward most shaft 26D to the rear most shaft 26C, with the intermediate shafts and beater blades tossing the roots and soil upwardly to dislodge the soil from the roots. The beater blades 86 are preferably positioned at a 90° arrangement, as shown in FIG. 3, with each alternate shaft being positioned at a 45 degree arrangement with respect to the adjacent shafts, so a continuous beating action is had on the roots, with sufficient speed and force to dislodge rocks and soil therefrom, which soil sifts down through the shafts and is returned to the terrain. Each of the beater blades 86 has a pair of braces 90 thereon, as will best be seen in FIG. 3 to rigidly secure the beater blades 86 to hollow shaft 36 and to the shafts which are connected in driving relation to shafts 26, 26A, 26B, 26C and 26D, as will best be seen in FIGS. 6 and 9.

Each beater blade 86 has a rounded portion 88 on the opposed ends thereof, so as each blade rotates in contact with the roots and soil, the roots will move rearwardly, with each rounded portion 88 of each beater blade 86 disengaging from the roots and moving the roots onto the next series of beater blades on shaft 36. The beater blades 86 of one shaft are off-set longitudinally approximately one-half the spacing between the beater blades of the adjacent shaft or shafts 36, and the beater blades on alternate shafts are on a 45 degree arcuate spacing with respect to the adjacent shaft or shafts. In this manner a continuous flow of roots thereover is had, without appreciable amounts of the roots falling downward between the shafts 36, which roots are deposited in a root catcher, designated generally at 92, which root catcher is pivotally mounted on the rear end of the root separator 16.

The root and soil separator 16 has forwardly extending tubular members 97 secured to the respective side plates 98, which members 97 each has a chain 99 secured thereto, as by welding, which chains extend forwardly to engage in a slotted anchor means 101 on the rear ends of the members of the root plow 2, so that, upon lifting the root plow 2 with winch 4 and block and tackle arrangement 8, the root and soil separator 16, together with the root catcher 92, as well as the blade 14, will be lifted clear of the ground to allow movement from place to place over the terrain, without the root plow engaging the ground and without the root and soil separator being in operation.

Root Catcher

The root catcher, particularly as shown in FIGS. 1 and 12, is pivotally mounted on transverse axis 93 which is supported by upright supports 96, which supports are weldably secured to root retainer side plates 98, one on each side of the root and soil separator 16, as will best be seen in FIGS. 1, 10 and 11.

The root catcher 92 is of sufficient capacity to hold roots for a desired length of travel. The root catcher 92 has a lug 100 welded to the rear upper side thereof to which lug a winch cable 102 is connected. The winch cable 102 passes over a sheave arrangement and is directed onto one of the dual winches 4, which winch is independently controlled to wind cable 102 thereonto and to permit cable to be payed out therefrom.

The root catcher 92, because of the weight thereof and the hinge arrangement to one side of the center of gravity, is self closing when the cable 102 is slackened, therefore, the roots accumulate in the catcher until sufficient in amount to be dumped. Whereupon, the cable 102 is tightened and the root catcher 92 pivots about the axis 93 until it is raised a sufficient height to premit the roots to be discharged onto terrain. The root catcher is preferably made of reinforced metal plates, as will best be seen in FIG. 1.

The roots may be dumped in such manner as to form rows, to enable a mechanical pick-up means to gather the roots thereby enabling the land to be thoroughly cleared, and if desired, the roots may be burned or otherwise disposed of.

Bar-like members 106 are secured to the lower side of the root catcher 92 and extend downwardly into close proximity to the surface of the terrain and forms a rake-like member to rake loose roots that have not been picked up by the root and soil separator, or which have otherwise become scattered over the terrain. Therefore upon raising the root catcher 92 by means of the winch line 102, the roots are dumped from the root catcher 92 and the roots which have been raked up by the downwardly extending bars 106 will be simultaneously dumped along with the other roots.

The brace member 94 and the transverse plate 91 secure the housings 18 and 20 in rigid relation with respect to each other and when the root plow 2 is coupled to the forward end of the root and soil separator 16, the root and soil separator becomes a rigid unit.

Rearwardly extending bars 95 are secured to transverse, non-rotatable brace member 94 immediately below the cover of the root catcher 92, so upon upward movement of the root catcher 92 about transverse axis 93 to the position indicated in dashed outline in FIG. 12, the bars will remain stationary, thereby to prevent the roots from moving upward so they will be discharged onto the terrain in piles or windrows, as desired.

Modified Form of the Invention

FIGS. 13 through 21 disclose a modified form of the invention. The various parts and elements on the modified form which are the same as the original form of the invention carry the same reference characters.

The present root and soil separating and windrowing apparatus designated generally by the numeral 16 shows dual caster wheels 22A and 24A on the rear thereof, which caster wheels enables greater maneuverability of the apparatus. By using dual wheels the machine operates more efficiently on soft terrain. The modified form of the device connects to a root plow 14 which root plow has a frame 2A extending forwardly to connect to a traction element 1 in a manner as disclosed in the aforementioned form of the invention.

Figure 14:
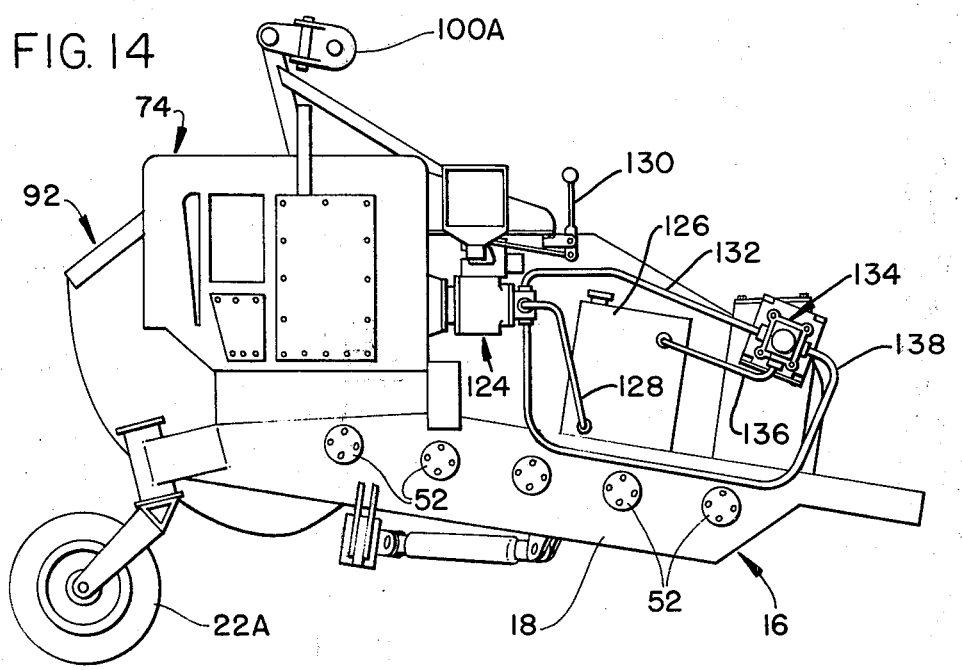
FIG. 14 is a side elevational view of a root and soil separating apparatus showing the prime mover, the variable capacity hydraulic pump and the reversible hydraulic motor and the reservoir for receiving and cooling the hydraulic fluid, and further showing detachable transverse and angulated braces across the bottom of the frame to hold the frame members in spaced apart, rigid relation.
Figure 15:
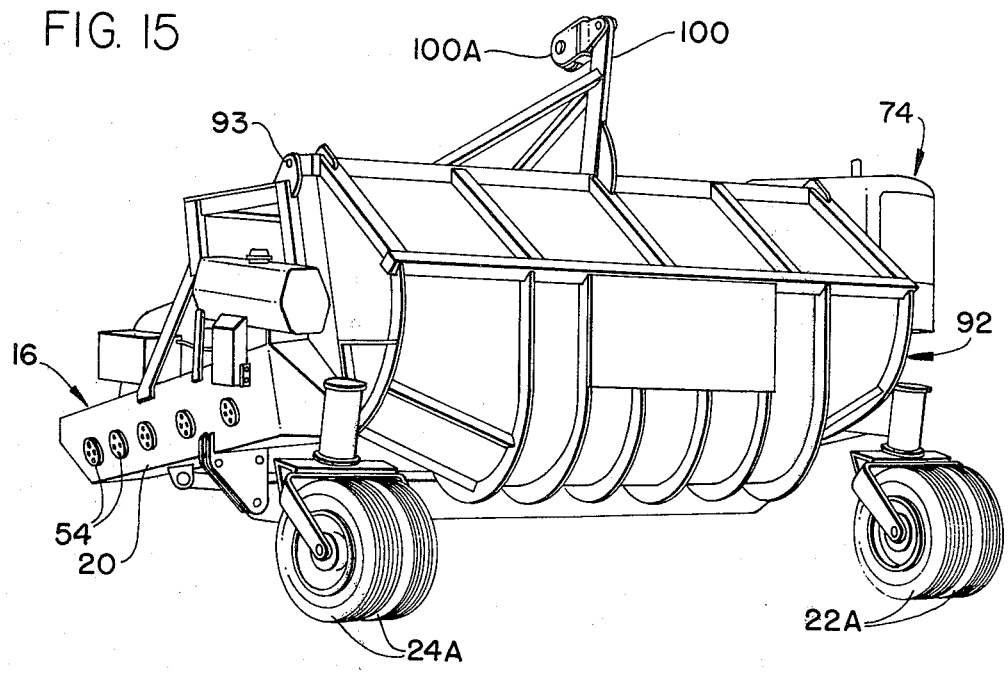
FIG. 15 is a perspective rear view of the root and soil separator showing the caster wheels supporting the rear portion of the unit, also showing the root and brush receptacle as having a hinged door.
Figure 16:
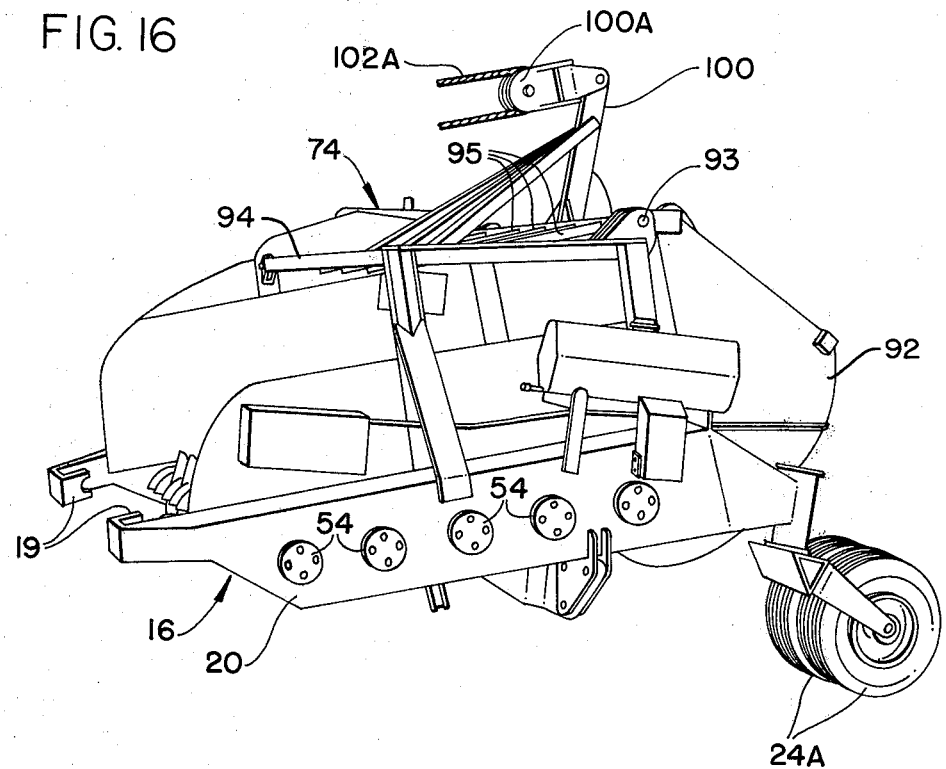
FIG. 16 is a perspective side elevational view of the root and soil separating apparatus, showing the side opposite that shown in FIG. 14, showing the caster wheels supporting the rear portion of the apparatus, and showing transverse and angulated braces on the bottom thereof, and showing a block and tackle pivoted to the upper side of the root receptacle.
Figure 17:
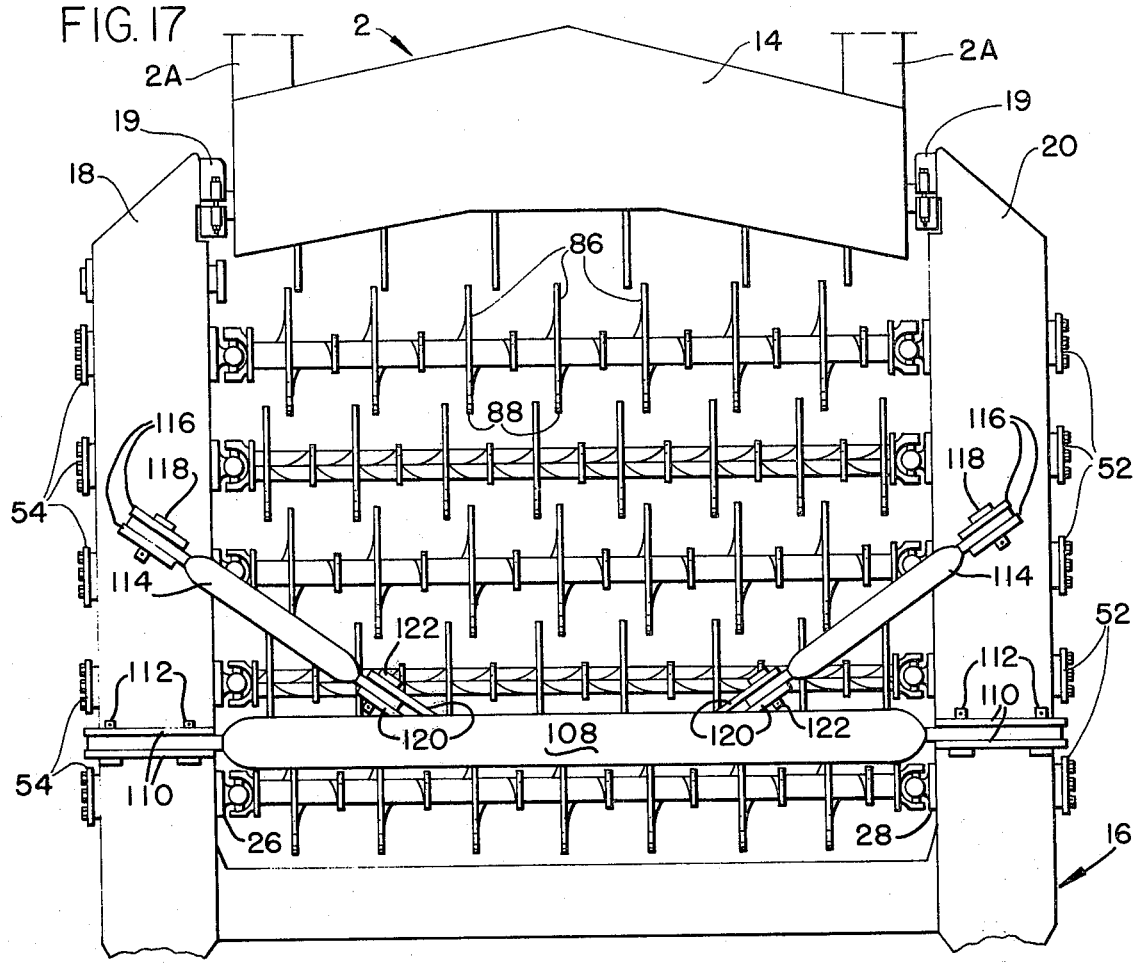
FIG. 17 is a bottom plan view of the root and soil separating apparatus showing a transverse and angulated braces detachably connected to the bottom frame members to stabilize the apparatus, and further showing a quick detachable universal joint associated with each end of each shaft, with the root plow blade being shown as connected between the forward ends of the root and soil separator frames, with portions of the frames being broken away and portions of the outwardly extending root plow arms being broken away.
Figure 18:
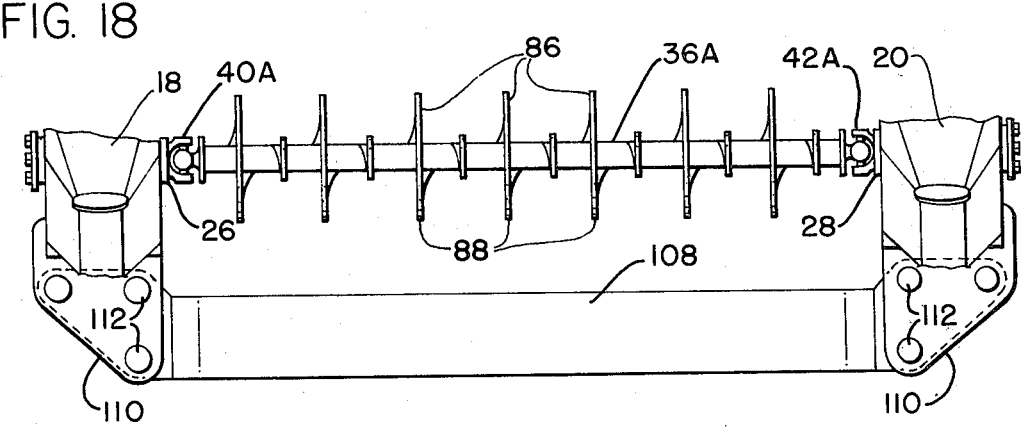
FIG. 18 is a fragmentary rear elevational view showing the detachable transverse brace between the frame members of the root and soil separator, and showing a detachable universal joint mounted on each end of a beater shaft.

The present form of the invention utilizes a sheave pulley 100A attached to upright member 100, which enables a block and tackle rope or cable 102A to pass therearound and over a pulley such as indicated at 104 on the traction element 1 to pass onto one of the winches 4. This enables the root catcher 92 to pivot on pins 93, as shown in FIGS. 14, 15 and 16 to enable the root catcher 92 to be raised to dump the roots therefrom in a manner similar to the aforementioned form of the invention, except by the use of a block and tackle arrangement over the sheave pulleys 100A, whereby more power can be exerted on the upright member 100 to which the pulley 100A is hingeably attached for lateral and vertical movement. The present form of the invention has a transverse member 94 extending between the sides that is similar to the transverse member 94 as shown in FIGS. 1 and 12, which member has rearwardly extending fingers 95 attached thereto to operate in the same manner as disclosed in the aforementioned form of the invention.

The present root and soil separator and windrowing apparatus has a transverse brace 108 detachably secured to the frame members 18 and 20 by lugs 110 by removable pins 112 to enable the device to be readily disassembled for transportation, or reassembled for operation. Further apertured, angulated braces 114 extend between side members 18 and 20 and the transverse brace member 108. Apertured lugs 116 are secured to the lower side of side members 18 and 20 to receive fastening pins 118 therethrough and through the respective apertured ends of braces 114. The transverse brace 108 has apertured lugs 120 secured thereto as by welding. The apertured lugs 120 are adapted to receive pins 122 therethrough to enable the braces 114 to be detachably secured thereto to enable the apparatus to be disassembled for shipment.

The transverse braces 108 and the angulated braces 114 hold the respective side frame members 18 and 20 in rigid relation when the pins 112, 118 and 122 are in place so proper alignment of the shafts 36A, 26X and 28X is had.

The universal joints 40A and 42A are provided and are interconnected between their respective shafts 26X and 36A; and 28X and 36A. Each shaft 36A has beater blades 86 thereon, which beater blades are substantially the same as the beater blades in the aforementioned form of the invention. The shafts 26X and 28X are independently journaled in their respective side frame members 18 and 20 in the same manner as disclosed in FIG. 6 of the aforementioned form of the invention.

The form of the invention as shown in FIGS. 13 through 21 utilizes a hydraulic drive system to drive a mechanism which rotates the beater blade shafts 36A. An internal combustion engine power unit 74 is mounted on the frame member 18 and drives a hydraulic pump unit 12A which withdraws hydraulic fluid from a reservoir 126 through conduit 128, and, due to the position of the valves and valve lever 130, hydraulic fluid will be directed from pump unit 124, through conduit 132 to and through hydraulic motor designated generally at 134, with the hydraulic fluid returning to the reservoir 126 through conduit 136 or the hydraulic fluid will be directed into conduit 138 back to the hydraulic pump 124, depending upon the operation being performed and the particular position of valve lever 130. The valve lever 130 operates a valving mechanism 140 so the motor 134 will cause the rotation of beater blade shafts 36A in one direction, as the hydraulic motor 134 drives shaft 70, sprocket 68, chain 66 and sprocket 64 to drive shaft 26D, which in turn drives a sprocket 58 to drive a series of chains 60 to drive a series of shafts similar to those shown in FIG. 6 of the aforementioned form of the invention. In so doing all of the beater blade shafts 36A will be driven in one direction.

Occasionally, it is necessary to reverse the direction of the rotation of the beater blade shafts 36A, in which instance the valve lever 130 is shifted to put the valving mechanism in a neutral position; the lever is then shifted to a position to direct hydraulic fluid from reservoir 126 through conduit 128 into hydraulic pump 124 and through conduit 138 into hydraulic motor 134, and either out through conduit 136 to reservoir 126 or out through conduit 132 to pump 124 to rotate the hydraulic motor 134 in the opposite direction. In so doing the hydraulic motor will drive the aforementioned sprockets, chains and shafts in the opposite direction, which in turn will rotate the beater blade shafts 36A in the opposite direction.

Figure 19:
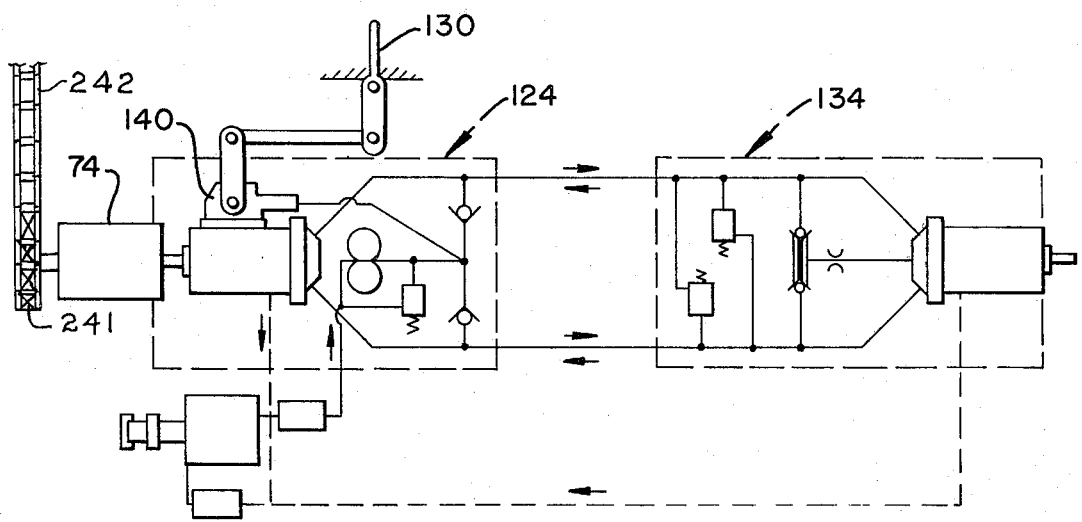
FIG. 19 is a diagrammatic view of a prime mover, a hydraulic drive system for the root and soil separator including a variable capacity hydraulic pump, a reversible motor, controls and a reservoir to make the system operative, and showing a sprocket on the hydraulic motor to drive the beater blade shafts.
Figure 20:
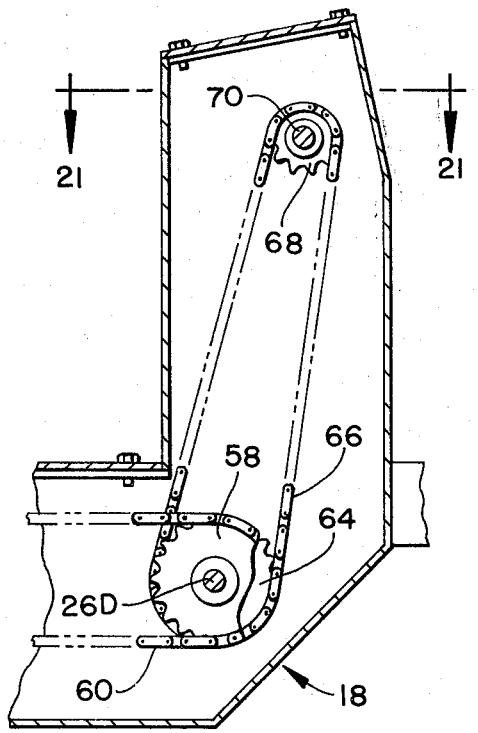
FIG. 20 is a fragmentary elevational view taken on the line 20—20 of FIG. 21, looking in the direction indicated by the arrows and showing a motor drive shaft with a sprocket thereon and an endless drive chain extending to a sprocket on a beater blade shaft to drive the beater blades.
Figure 21:
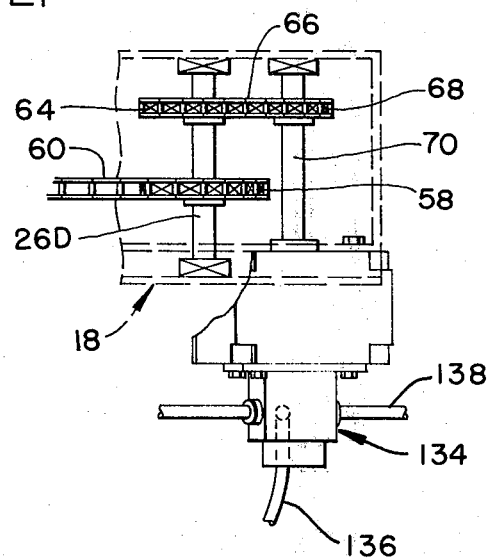
FIG. 21 is a fragmentary sectional view taken on the line 21—21 of FIG. 20, looking in the direction indicated by the arrows, showing the hydraulic motor mounted on a support housing, and showing a chain leading from the drive shaft of the sprockets on the beater blade shafts.

Normally, the beater blade shaft will rotate in a counterclockwise direction facing the side of the frame 18 on which the power unit 74 is mounted which will move the roots rearwardly therealong and into the root catcher 92 in the same manner as in the aforementioned form of the invention. Should the roots become entangled in the beater blade shafts 36A in a clockwise direction until the roots become dislodged so that the beater blade shafts 36A may be freely rotated in a counterclockwise direction. A diagrammatic view of the hydraulic system is shown in FIG. 19, which, in the present instance, is a Dynapower hydraulic pump and motor drive system known as "phase 4" which enables the pump to be driven in one direction and with the valving system being such that the motor may be driven in either direction, however, it should be understood that any suitable hydraulic drive system may be used to drive the beater blade shafts. The portions of the motor and associated mechanism is designated generally by the numeral 124, as shown within dashed outline FIG. 19, with the valving and bypass mechanism shown therein being conventional.

The pump mechanism as designated generally by the numeral 134 is shown within dashed outline in FIG. 19, which motor houses the bypass and check valves and are accepted as conventional, with further detailed description thereof being deemed unnecessary.

Modified form of the Invention

Figure 22:
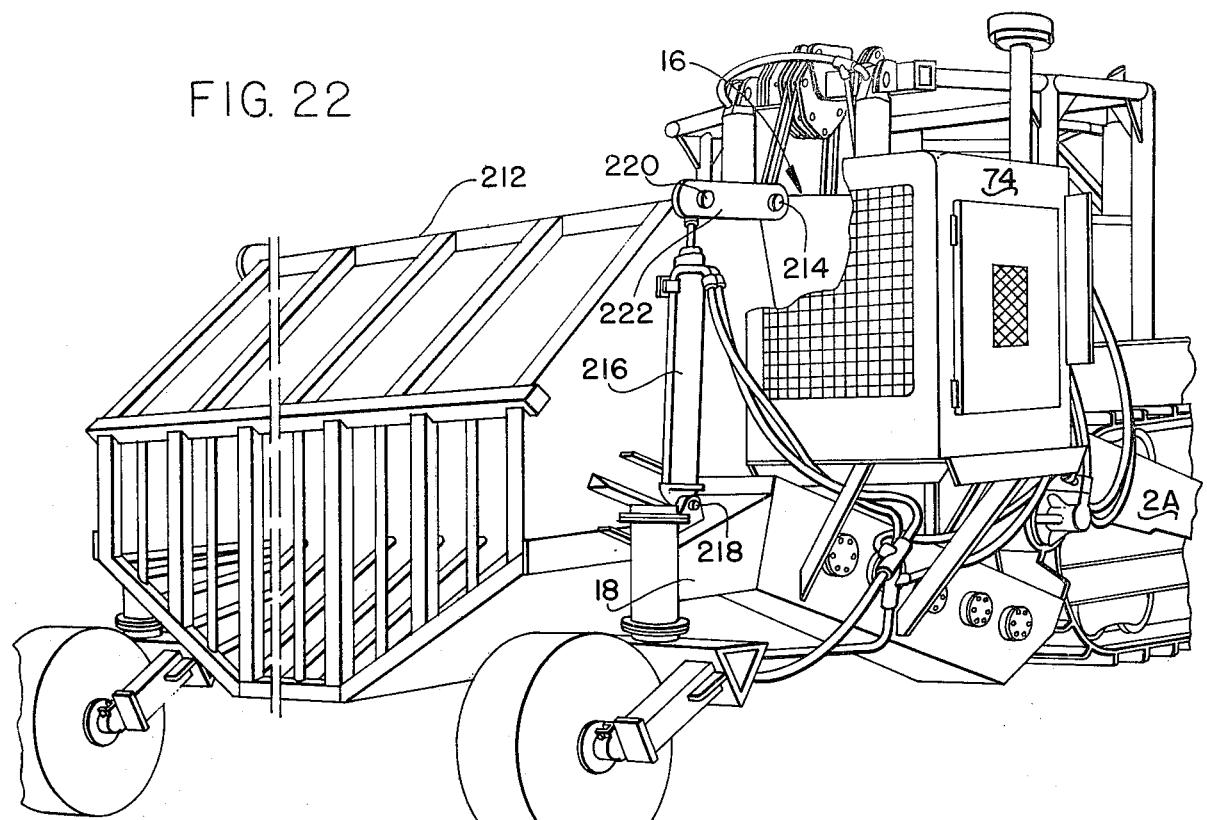
FIG. 22 is a fragmentary, perspective view of the traction mechanism, the root plow and the root receptacle, with parts being broken away and shortened.
Figure 23:
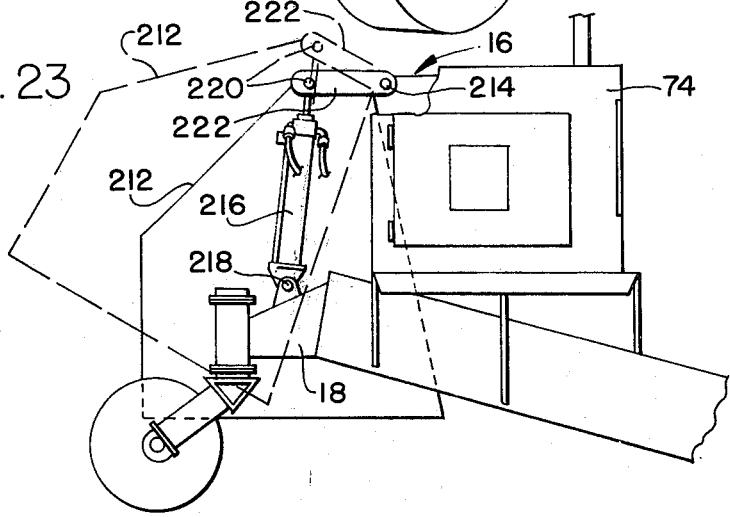
FIG. 23 is a fragmentary elevational view of the root and soil separator, showing the closure in full outline in one position, another position thereof being shown in dashed outline.
Figure 24:
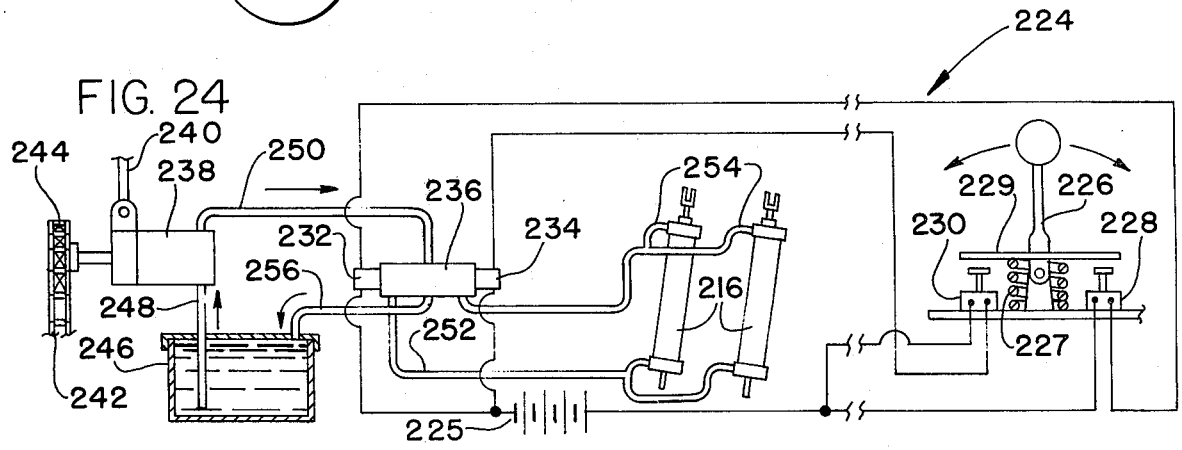
FIG. 24 is a schematic diagram of the hydraulic and electrical system to control the closure for the root receptacle, with parts being broken away and shortened and with parts being shown in section.

A further modified form of the invention is shown in FIGS. 22 through 24, which modified form of root catcher 212 is pivotally attached to the root and soil separating apparatus 16 at a pivot point 214. A hydraulic cylinder-plunger assembly 216 is mounted on each side of the root catcher 212 with the lower end of each hydraulic cylinder-plunger assembly being pivotally attached to each frame portion 18, near the rear end thereof by the respective pivot pins 218, with the upper ends thereof being pivotally attached to a pivot pin 220 secured to bar 222, which bar is welded or otherwise secured near the upper end of root catcher 212.

The raising and lowering of the root catcher by the hydraulic cylinder-plunger assemblies 216 is remotely controlled from the driver's seat, by an electrical circuit 224 which circuit utilizes a double throw switch lever 226 to depress either switch 228 or switch 230, which actuate the respective solenoid coils within four-way solenoid valve assembly 236. With the hydraulic pump 238 shifted into operational condition by clutch lever 240, the power unit 74, FIG. 19, will drive through sprocket 41 and through chain 242 to drive sprocket 244 to cause pump 238 to withdraw fluid from reservoir 246 through conduit 248 and discharge from pump 238 into conduit 250 and through solenoid valve 236, and with the coil 232 having been energized, hydraulic fluid under pressure will be directed into conduit 252 to the lower end of the hydraulic cylinder-plunger assemblies 216, with the hydraulic fluid discharging outward through conduits 254 through four-way solenoid valve 236 into conduit 256 into reservoir 246.

When it is desired to lower the root catcher from the position as shown in FIG. 23 to that shown in full outline in FIGS. 22 and 23, the lever 226 is shifted to depress switch 228, which will direct current from battery 225 into and through switch 230 to solenoid 234 to move the valve member therein to a position to direct hydraulic fluid from reservoir 246 through conduits 248 and 250 into four-way solenoid valve 236, thence into conduits 254 at the upper ends of the cylinder-plunger assemblies 216 with the hydraulic fluid being discharged from the lower end of the cylinder-plunger assemblies into and through solenoid valve 236 into discharge conduit 256 to reservoir 246 to move the root catcher from the position as shown in dashed outline in FIG. 23 to the full outline position as shown in FIGS. 22 and 23.

A spring 227 surrounds the base of lever 226 and is in bearing relation with plate 229 to move the plate to the position as shown in full outline in FIG. 24. The switches 228 and 230 are normally open switches, and when released by plate 229, will move into the position as shown in full outline in FIG. 24.

It can be appreciated that only the circuit wires of circuit 224 need to lead from the driver position on the traction element to the four-way valve 236, to enable the opening and closing of the root catcher apparatus 212.

While the closure member in this form of the invention is slightly different in form and shape from the cable operated form of the invention, as shown in FIG. 1, it is to be understood that the particular shape of the closure member is not controlling so long as the hydraulic cylinder-plunger assemblies perform the opening and closing of the root catcher element, which is believed to be clearly shown in FIGS. 22 through 23, with the hydraulic system for operating the root catcher mechanism.

What is claimed is:

1. In combination with a tractor and a root plow adapted to be attached to said tractor, root and soil separating apparatus adapted to be attached to said root plow comprising
   a. a pair of spaced apart, longitudinal frame members,
      1. at least one rotatably mounted wheel on the rear end of each said frame member to form a support therefor for movement over the terrain,
   b. connector members on the forward end of each said longitudinal frame member to pivotally connect each said frame member to said root plow,
   c. a plurality of transverse shafts extending between and rotatably mounted on said longitudinal frame members,
      1. beater elements secured to each said transverse, rotatable shaft, at spaced intervals, for rotation of said beater elements above the terrain,
   d. said plurality of transverse shafts having the beater elements thereon so spaced as to direct roots upwardly and rearwardly along the upper side of the circumferential path described by the beater elements to direct roots off of the upper-most beater elements,
   e. a downwardly extending, apertured first lug secured to the lower side of each said longitudinal frame member intermediate the ends thereof, which lugs are in transversely aligned relation,
   f. a transverse brace, which brace has an aperture formed therein near each end thereof, which transverse brace extends between said downwardly extending first lugs, so the apertures in the respective ends of said brace and the apertures in said first lugs will be in register, 1. fastening means extending through the aperture in each said first lug and through the respective apertures in said transverse brace to detachably secure said brace to said first lugs, and g. power means connected in driving relation with said shafts to rotate said beater elements to dislodge soil from the roots as the roots are moved upwardly and rearwardly.

2. The invention of claim 1, further including a. a second apertured lug secured to each said longitudinal frame member intermediate said respective first apertured lugs and an end of the frame member and being positioned transversely with respect to each other on the lower side of the respective longitudinal frame members at an acute angle to said first apertured lugs,
 1. a third apertured lug secured to said transverse brace a spaced distance inward from each end thereof and positioned at an angle to be in aligned relation with respect to said respective second lugs, b. second braces, each having an aperture formed therein near each end thereof, which second braces are adapted to be positioned between said second and said third lugs so the apertures in said lugs and the apertures in the respective ends of said braces will be in register,
 1. fastening means extending through the apertures in said second lugs on said longitudinal frame members and the apertures in said third lugs on said transverse brace members to form detachable, angulated braces between said longitudinal frame members and said transverse braces.

3. The invention of claim 1, further including a. a hydraulic pump connected in driven relation with said power means,
 1. a source of hydraulic fluid,
 2. means interconnecting, in fluid communication, said source of hydraulic fluid with said hydraulic pump, b. a hydraulic motor connected in driving relation with said shafts, c. conduit means interconnecting said hydraulic pump and said hydraulic motor to direct hydraulic fluid under pressure therethrough to selectively rotate said hydraulic motor in either direction, d. valve means within said conduit means leading from said hydraulic pump to said hydraulic motor, to selectively direct hydraulic fluid from said hydraulic pump to said hydraulic motor to drive said motor and said shafts in a selected direction.

4. The invention of claim 1, further including a. a root catcher pivotally mounted on the rear end of said root and soil separating apparatus.

5. The invention of claim 4, further including a. control means to operate said root catcher from a remote position.

6. The invention of claim 1, further including a root catcher pivotally mounted on said root and soil separating apparatus, a. a hydraulic assembly pivotally connected to selected parts of said root and soil separating apparatus and said root catcher, and b. control means co-acting with said hydraulic assembly and being adapted to open and close said root catcher.

7. The invention of claim 1 further including a. a root catcher pivotally connected to said root and soil separating apparatus, b. a hydraulic cylinder-plunger assembly pivotally connected at one end to a selected portion of each longitudinal frame member and pivotally connected at the other end to a selected portion of said root catcher,
 1. at least one conduit connected to each said cylinder-plunger assembly to selectively raise said root catcher, when hydraulic pressure is applied to said cylinder-plunger assembly, c. a source of hydraulic fluid under pressure, d. valving means intermediate said source of hydraulic fluid under pressure and said cylinder-plunger assemblies to direct hydraulic fluid thereinto under pressure and to direct fluid therefrom, and e. means for selectively controlling said valving means.

8. The invention of claim 7 wherein a. each said hydraulic cylinder-plunger assembly comprises a double acting fluid cylinder,
 1. each said hydraulic cylinder-plunger assembly has a conduit to each end thereof and to said valving means, b. said valving means comprising a solenoid operated valve to selectively direct hydraulic fluid from said source of hydraulic fluid under pressure into one end of each said cylinder and discharge hydraulic fluid from the other end of each said hydraulic cylinder-plunger assembly, c. said means for controlling said solenoid valve including an electrical circuit connected with a source of electricity,
 1. two normally open switches within said circuit and connected in series with the respective solenoids of said valve and with said source of electricity, so upon closing one of said switches said solenoid valve will be moved into one position to direct hydraulic fluid thereinto and therethrough and when said first switch is open and a second switch is closed, said solenoid valve will be moved to another position to direct hydraulic fluid thereinto and therethrough in the opposite direction.

9. The invention of claim 7 wherein a. said means for controlling said valving means is remote from said hydraulic cylinder-plunger assembly.

10. In combination with a tractor and a root plow adapted to be attached to said tractor, root and soil separating apparatus adapted to be attached to said root plow comprising a. a pair of spaced apart, longitudinal frame members,
 1. at least one rotatably mounted wheel on the rear end of each frame member to form a support therefor for movement over the terrain, b. connector members on the forward end of each frame member to pivotally connect each frame member to said root plow, c. a plurality of transverse shafts extending between and rotatably mounted on said frame members,
 1. beater elements on each shaft, for rotation of said beater elements above the terrain, d. said plurality of shafts and beater elements thereon so spaced as to direct roots upwardly and rearwardly along the upper side of the circumferential path described by said beater elements, e. a transverse brace detachably secured to a selected portion of each frame member, f. hydraulically activated means connected in driving relation with said shafts to rotate said beater elements to dislodge soil from the roots as the roots are moved upwardly and rearwardly, g. a root catcher pivotally mounted on the rear end of said root and soil separating apparatus, and h. control means to operate said root catcher from a remote position.

\* \* \* \* \*